Patented Mar. 17, 1953

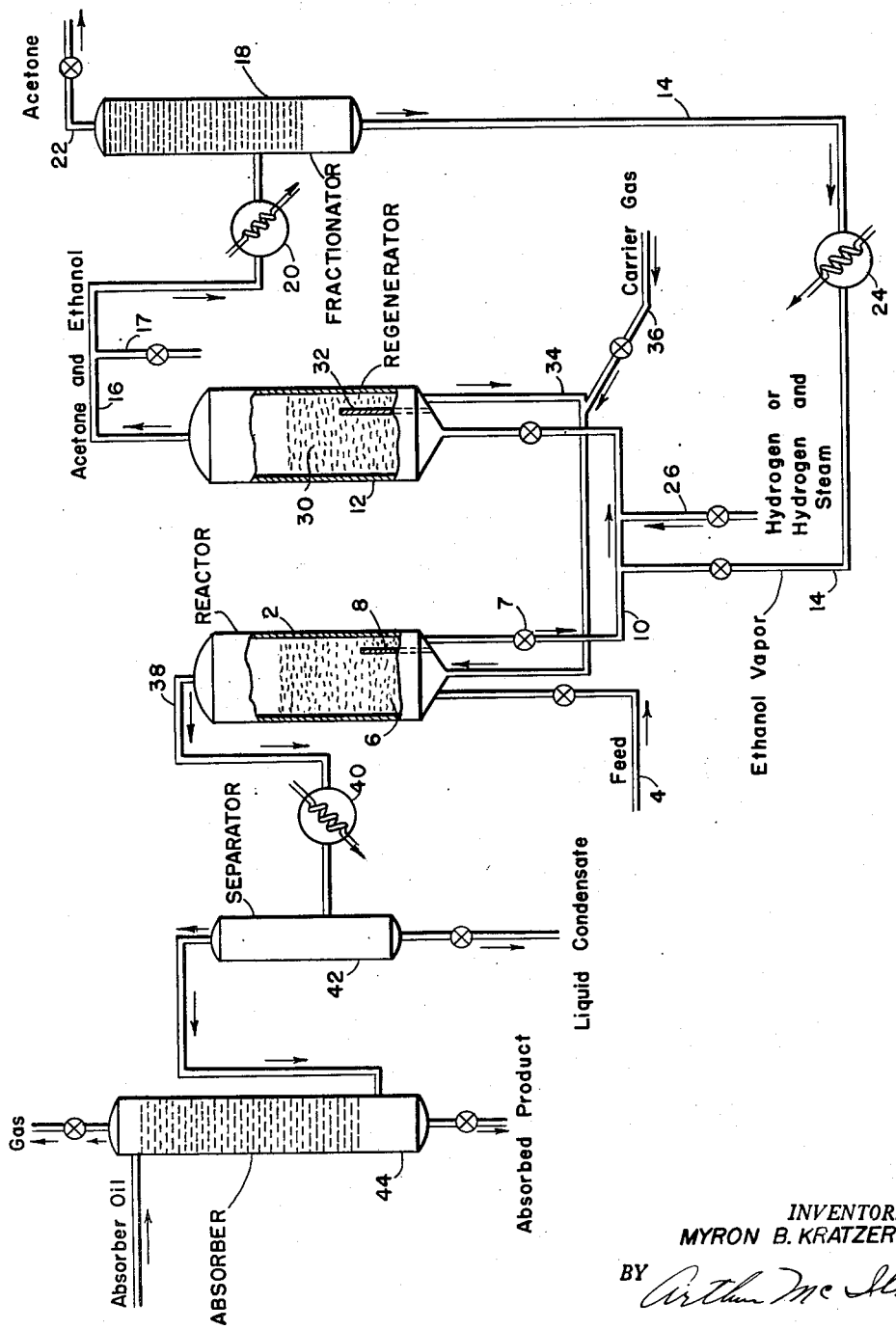

2,632,015

UNITED STATES PATENT OFFICE 2,632,015

REGENERATION OF HYDROCARBON SYNTHESIS CATALYST BY TREATMENT WITH ETHANOL

Myron B. Kratzer, Tulsa, Okla., assignor to Stanolind Oil and Gas Company, Tulsa, Okla., a corporation of Delaware Application June 29, 1949, Serial No. 101,994

12 Claims. (Cl. 260—449.6)

The present invention relates to certain aspects of hydrocarbon synthesis involving the reduction of carbon monoxide with hydrogen in the presence of a suitable catalyst and, in general, pertains to a method for the interconversion of ethanol and acetone by subjecting one or the other of these compounds to conditions such as those that ordinarily prevail in the aforesaid hydrocarbon synthesis process.

An object of my invention is to provide a method for converting ethanol to acetone. Another object of my invention is to provide a method whereby it is indirectly possible to alter the ratio of ethanol to acetone produced by the hydrocarbon synthesis in the event market conditions favor one of these compounds over the other. Another object of my invention is to provide a means for reconditioning the hydrocarbon synthesis catalyst by treating the latter with a component of the product stream. A still further object of my invention is to provide a process for reconditioning the spent catalyst employed in the hydrocarbon synthesis thus making possible the continuous operation of said synthesis to thereby secure the obvious economical advantages inherent in a continuous operation.

The conditions under which reaction is effected between carbon monoxide and hydrogen by the use of a catalyst, either in the form of a fixed bed or in a fluidized condition, to produce liquid hydrocarbons together with a substantial proportion of chemicals have been described at considerable length in both the current patent and technical literature; therefore, it is considered unnecessary to set forth such conditions in detail in the present description. I wish to point out, however, that in the aforesaid synthesis one of the chief factors in determining the duration of a particular run with a given batch of catalyst has been based upon the ability of the latter to retain the desired degree of activity and fluidity in spite of the severe conditions encountered in the reactor in which hydrocarbon synthesis occurs. Thus, after the synthesis reactor has been on stream for a period of days or weeks, the density of the fluidized catalyst bed is observed to decrease from an initial value of from about 90 to 100 lbs. per cu. ft. to a density of from about 15 to 30 lbs. per cu. ft. When the latter condition prevails, continued operation becomes highly uneconomical and, as a result, the reactor must be shut down, the spent catalyst withdrawn and dumped or sent to a regenerator and a fresh batch of active catalyst charged to the reactor. Simultaneously with the reduction in catalyst density there occurs a deposition of carbonaceous matter on the surface of the catalyst, some of which is elemental carbon and some of which consists of high melting waxes produced during the reaction. The extent to which this carbonaceous material is found on the spent catalyst will vary, but I have observed that elemental carbon alone is generally deposited thereon in amounts of from about 2 up to about 25 to 30 per cent of the total mass of catalyst and carbonaceous matter. In general, however, after the quantity of deposited carbon reaches a value of 8 or 10 per cent, it is not considered economical to continue the synthesis. The concentration of carbonaceous material on the catalyst such as, for example, free carbon, wax, etc., is not necessarily an unqualified criterion of catalyst activity. Thus, I have frequently found that carbon monoxide conversion may drop as much as 25 to 30 per cent when operating with a catalyst which on subsequent analysis showed free carbon to be present to the extent of only from about 2 to 5 per cent. It is known that during synthesis of hydrocarbons in accordance with this process, when employing an iron catalyst, an iron carbide having the formula $Fe_2C$ is produced. A number of theories attempting to explain the role of the catalyst in this synthesis have postulated that the catalyst, before it becomes suitably activated to promote the desired reaction, is first converted into the form of a carbide. The existence of carbidic iron in the form of $Fe_2C$ in the active synthesis catalyst has been definitely proved. Whether or not the various forms of carbides produced during synthesis are converted from an active state to a form that functions as an inhibitor of the desired reaction or whether, under certain conditions of operation, the catalysts converted into a physical form which is inactive, is not known. As pointed out above, however, I have observed in some instances that under normal synthesis conditions, i. e., pressures of 250–400 p. s. i., temperatures of about 600° to 680° F., and a feed gas containing about 90 to 95 per cent hydrogen and carbon monoxide in a ratio of 2:1, after a few hundred hours of operation the catalyst becomes inactive, although subsequent analysis thereof indicates less than 10 per cent carbonaceous matter to be present.

According to my invention I have devised a process whereby the used catalyst normally obtained from the above-mentioned hydrocarbon synthesis may be advantageously employed to convert ethanol into acetone. My invention further contemplates the reuse of such catalyst in the hydrocarbon synthesis after it has been utilized to promote the aforesaid conversion of ethanol to acetone. Thus, is accordance with one embodiment of my invention, a used hydrocarbon synthesis catalyst is withdrawn from the reactor and introduced into a suitable regenerating or reconditioning zone at a temperature in the range of from about 540° to about 700° F., for example, 625° to 690° F., and preferably 660° to 680° F. In converting ethanol to acetone in the presence of a used hydrocarbon synthesis catalyst it is preferable, although not essential, to effect this operation by introducing ethanol vapor upwardly through a fluidized bed of catalyst. In carrying out this step of my invention, the ethanol vapor is introduced into the regenerator at a rate sufficient to maintain the catalyst bed in a fluidized condition such as, for example, at the rate of from about 0.1 to about 2.0 ft. per second. Under the conditions thus provided, ethanol is readily converted to acetone. The means by which this reaction occurs is not accurately known; however, such reaction appears to be most logically explained by assuming that the principal mechanism involves reaction of ethanol with a carbidic form of the catalyst metal. Regardless of the particular reaction that occurs, removal of carbon, i. e., coke, free carbon, or carbon in carbidic form, may be effected by employing the treatment herein set forth. Thus, with iron carbide the reaction is illustrated by the following equation:

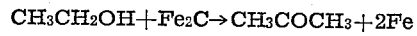

$$CH_3CH_2OH + Fe_2C \rightarrow CH_3COCH_3 + 2Fe$$

In order to effect maximum conversion to free catalyst metal and acetone, the total ethanol feed, i. e., the quantity actually consumed plus the amount recycled, should preferably amount to from about 40 to 50 lbs. for each 50 lbs. of catalyst present. After the conversion of the catalyst carbide to the metal has been substantially completed, as may be evidenced by the sharp drop of acetone concentration in the regenerator tail gas, the catalyst thus treated may then be transferred, if desired, to the synthesis reactor for use in a succeeding cycle.

While substantially any used hydrocarbon synthesis catalyst may be employed to promote the above-mentioned reaction, it is generally desirable to employ catalysts having less than about 10 per cent carbonaceous matter deposited on the surface thereof. Catalysts having higher concentrations of carbon may be utilized; but the activity of such a catalyst per unit weight, in so far as their ability to promote the involved reaction is concerned, is materially less than those in which the carbonaceous matter is present in concentrations below about 10 per cent. Excessive quantities of carbon may be removed from the catalyst, however, prior to the introduction thereof into the synthesis reactor by means of the usual treatment with hydrogen or a mixture of hydrogen and steam at elevated temperatures. This treatment may be effected at temperatures of from about 600° to 1400° F., preferably from 700° to 900° F., for a period of from eight to fifteen hours in a manner such that a fluidized catalyst bed is maintained. In this connection, the expression "used hydrocarbon synthesis catalyst" as employed in the present description and claims is intended to cover the hydrocarbon synthesis catalyst in both active and spent forms in contradistinction to a fresh catalyst, i. e., one that has not previously been subjected to hydrocarbon synthesis conditions or to conditions which produce a catalyst of similar characteristics. Thus, in accordance with my invention, a hydrocarbon synthesis catalyst either in active or spent form will promote the reactions contemplated herein, viz., the conversion of acetone to ethanol or the reverse of this reaction. Moreover, although the present description is limited to used iron synthesis catalysts for use in effecting my invention, it is to be understood that I do not desire to restrict the scope of my invention thereto in this regard; but, on the contrary, I may employ as a catalyst in carrying out my novel process any used catalyst derived from metals known to be capable of promoting the synthesis of hydrocarbons from carbon monoxide and hydrogen such as, for example, cobalt, ruthenium, nickel, etc.

The oxide content of the catalyst obtained in accordance with the above procedure will vary with the quantity of water present in the alcohol employed. In order to maintain the concentration of catalyst oxide at a practical minimum, however, it is generally preferably to employ solutions consisting from about 75 to about 95 per cent ethanol. From the standpoint of oxide formation in the regeneration step, even more highly concentrated solutions of ethanol are, of course, desirable. However, for economic reasons, the use of substantially pure ethanol is not considered practical.

As a result of the treatment with a mixture of hydrogen and steam or with hydrogen alone in the manner indicated above, the catalyst obtained contains less than about 5 per cent oxide. The procurement of a catalyst having such a relatively low oxide content may be ascertained from analysis of the water present in the resulting tail gas. This catalyst, as well as that obtained from the ethanol treatment alone, may then be introduced in suspension into the reactor by means of a suitable gas stream consisting, for example, of synthesis gas. In the event this treatment with hydrogen is not considered necessary or desirable, the catalyst may be slowly introduced into the lower portion of the synthesis reactor where reducing conditions are encountered thereby effecting further reduction of the catalyst oxide to the free metal.

While I have emphasized the applicablility of the process of my invention to an integrated hydrocarbon synthesis process involving regeneration or reconditioning of the used catalyst employed therein by reacting said catalyst with ethanol to form acetone, it is to be strictly understood that my invention is not limited thereto but, on the contrary, may be employed to produce ethanol from acetone. Thus, under the conditions generally outlined above, I may employ a suitable hydrocarbon synthesis catalyst such as, for example, reduced mill-scale, in the form of a fluidized bed and contact the latter with a stream of acetone vapors to give high conversions and yields of ethanol. In this connection, the reaction involving the conversion of acetone to ethanol may be promoted by the use of fresh hydrocarbon synthesis catalysts in addition to the application of "used catalysts" as herein defined. In general, it has been my observation that optimum yields of ethanol are obtained by employing temperatures ranging from about 540° to 625° F., whereas the reaction between ethanol and free carbon to produce acetone proceeds best at temperatures in the neighborhood of from about 625° to about 680° F. In producing ethanol from acetone in the manner described above, the catalyst may be regenerated by treatment with a portion of ethanol as taught herein, or by any one of several methods already known to the art.

A preferred application of my invention will be better understood by reference to the accompanying drawing wherein a synthesis feed containing carbon monoxide and hydrogen in a ratio of approximately 1:2 is introduced into reactor 2 through line 4 at a temperature of from about 540° to about 700° F. and at a pressure preferably in the range of about 150 to about 600 p. s. i. After initial indication that the catalyst in fluidized bed 6 is becoming deactivated, as may be evidenced by the decrease in carbon monoxide conversion, valve 7 is opened to allow the catalyst to pass at the desired rate around baffle 8 and be withdrawn through line 10, after which it is introduced into regenerator 12 together with ethanol vapor from line 14. Reconditioning of the catalyst in regenerator 12 continues at a temperature of from about 625° to about 680° F. and at a pressure of from about 250 to 400 p. s. i. until acetone withdrawn through line 16 is no longer present in readily detectable quantities as may be determined by periodically withdrawing gas samples from line 17. The vaporous mixture of acetone and ethanol is conducted to fractionator 18 through condenser 20 where separation of acetone from ethanol is effected, the former being removed through line 22 and the latter being returned to regenerator 12 in vapor form via line 14, heater 24, and line 10. After the ethanol treatment of the catalyst has been completed, hydrogen or a reducing mixture of hydrogen and steam may be introduced, if desired, into line 10 and reactor 12 through line 26 in order to reduce the oxide content of the treated catalyst to a minimum and to further remove residual carbon. Treatment with hydrogen or with a mixture of hydrogen and steam is preferably effected at a temperature in the regeneration zone of from about 700° to 900° F. and at pressures in the nieghborhood of 250 to 400 p. s. i. To ensure substantially complete reduction of the oxide to the free metal, hydrogen is introduced into regenerator 12 until no appreciable quantity of water vapor can be identified in the regenerator tail gas passing through line 16 and withdrawn through sampling line 17. The reconditioned catalyst in fluidized bed 30 flows over baffle 32 and is returned to reactor 2 through line 24 with the aid of a suitable carrier gas such as, for example, synthesis gas, introduced into line 34 through line 36 thereby completing the catalyst cycle. The product vapors are withdrawn from reactor 2 through line 38 leading to condenser 40, separator 42, and absorber 44.

In the above-mentioned drawing reference to certain equipment such as pumps, gages, and the like which obviously would be necessary to operate the process has been intentionally omitted. Only sufficient equipment has been diagrammatically shown to illustrate the process, and it is intended that no undue limitation be read into my invention by reference to the drawing and description thereof.

The conversion of ethanol to acetone accomplished by the simultaneous removal of carbon from a used synthesis catalyst in accordance with my invention may be further illustrated by the following specific example.

*Example*

A quantity of used iron hydrocarbon synthesis catalyst amounting to 247 lbs. was introduced, in accordance with the method illustrated in the description of the accompanying drawing, into a suitable regenerator at a temperature of about 680° F. The carbon content of the catalyst, based on the weight of the iron, prior to treatment was 11 per cent. Ethanol vapor was next introduced into the regenerator at a linear velocity of about 1.5 ft. per second in order to maintain the catalyst bed in a fluidized state. Under these conditions, the molar ratio of acetone to ethanol withdrawn from the regenerator in the effluent gases was 0.50. Introduction of ethanol was halted after analysis of the catalyst indicated that the carbon content had been reduced to 0.3 per cent based on the weight of iron. During this period of treatment a total of 103 lbs. of acetone was produced requiring 246 lbs. of ethanol which included the quantity of ethanol converted, i. e., 82 lbs., together with the quantity of ethanol required for recycle, i. e., 164 lbs.

To demonstrate the ratio of acetone to ethanol present in the tail gas at different reaction temperatures, a series of runs was made in which the same conditions were employed, with the exception of temperatures, as were utilized in the foregoing example. The results obtained appear in tabular form below.

| Temperature, °F. | Molar Ratio of Acetone to Ethanol in Tail Gas |
| --- | --- |
| 560 | .068 |
| 580 | .094 |
| 600 | .140 |
| 620 | .190 |
| 640 | .270 |
| 660 | .380 |
| 680 | .500 |

It will be recognized by those skilled in the art to which my invention is directed that numerous alterations or modifications may be made in the process herein generally set forth without departing from the scope of said invention. Thus, with some used catalysts, it may be considered necessary or desirable to regenerate such catalysts with a mixture of ethanol and acetone at temperatures favorable to the formation of acetone, i. e., of the order of about 625° to about 680° F. If desired, the resulting catalyst may be reduced with hydrogen or with a reducing mixture of hydrogen and steam at a temperature of 700° to 900° F. for a period of eight to fifteen hours prior to charging into the synthesis reactor for a succeeding cycle. It is to be further understood that while the conversion of ethanol to acetone in accordance with my invention can, as mentioned above, be best explained on the assumption that the principal reaction occurs between ethanol and a carbidic form of the catalyst, my invention is not limited to any particular theory or explanation as to how or in what manner the results claimed herein are achieved. On the contrary, the process of my invention is concerned broadly with the conversion of ethanol to acetone in the presence of a spent, deactivated hydrocarbon synthesis catalyst.

What I claim is:

1. A process for regenerating an iron catalyst which has become spent as a result of continued contact with carbon monoxide and hydrogen in the synthesis of hydrocarbons by the reduction of carbon monoxide with hydrogen, which comprises contacting said spent catalyst with ethanol at a temperature of from about 540° to about 700° F. whereby said ethanol is converted into acetone, said process being effected in the absence of hydrocarbon synthesis, continuing the treatment of said spent catalyst with ethanol at least until a definite decrease in acetone formation is observed, and thereafter charging the resulting treated catalyst to a synthesis reactor for further conversion of carbon monoxide and hydrogen into hydrocarbons.

2. The process of claim 1 in which the hydrocarbon synthesis catalyst is an iron catalyst and the temperature employed ranges from about 625° to about 680° F.

3. A process for regenerating an iron catalyst which has become spent as a result of continued contact with carbon monoxide and hydrogen in the synthesis of hydrocarbons by the reduction of carbon monoxide with hydrogen, which comprises contacting said spent catalyst with ethanol in a concentration of from about 40 to about 50 lbs. for each 50 lbs. of catalyst at a temperature of from about 540° to about 700° F. whereby said ethanol is converted into acetone, said process being effected in the absence of hydrocarbon synthesis, continuing the treatment of said spent catalyst with ethanol at least until a definite decrease in acetone formation is observed, and thereafter charging the resulting treated catalyst to a synthesis reactor for further conversion of carbon monoxide and hydrogen into hydrocarbons.

4. A process for regenerating an iron catalyst which has become spent as a result of continued contact with carbon monoxide and hydrogen in the synthesis of hydrocarbons by the reduction of carbon monoxide with hydrogen, which comprises contacting said spent catalyst with ethanol in a concentration of from about 40 to about 50 lbs. for each 50 lbs. of catalyst at a temperature of from about 625° to about 680° F. whereby said ethanol is converted into acetone, said process being effected in the absence of hydrocarbon synthesis, continuing the treatment of said spent catalyst with ethanol at least until a definite decrease in acetone formation is observed, and thereafter charging the resulting treated catalyst to a synthesis reactor for further conversion of carbon monoxide and hydrogen into hydrocarbons.

5. A process for regenerating an iron catalyst which has become spent as a result of continued contact with carbon monoxide and hydrogen in the synthesis of hydrocarbons by the reduction of carbon monoxide with hydrogen, which comprises contacting said spent catalyst with ethanol in a concentration of from about 40 to about 50 lbs. for each 50 lbs. of catalyst at a temperature of from about 625° to about 680° F. whereby said ethanol is converted into acetone, said process being effected in the absence of hydrocarbon synthesis, continuing the treatment of said spent catalyst with ethanol at least until a definite decrease in acetone formation is observed, thereafter charging the resulting treated catalyst to a synthesis reactor for further conversion of carbon monoxide and hydrogen into hydrocarbons, withdrawing a mixture of acetone and ethanol from the regeneration zone, separating the acetone from the ethanol, and recycling the latter to said regeneration zone.

6. A process for regenerating an iron catalyst which has become spent as a result of continued contact with carbon monoxide and hydrogen in the synthesis of hydrocarbons by the reduction of carbon monoxide with hydrogen, which comprises contacting said spent catalyst with ethanol at a temperature of from about 540° to about 700° F. whereby said ethanol is converted into acetone, said process being effected in the absence of hydrocarbon synthesis, continuing the treatment of said spent catalyst with ethanol at least until a definite decrease in acetone formation is observed, thereafter subjecting the resulting treated catalyst to the action of hydrogen at a temperature of from about 1000° to about 1400° F. to convert substantially all of the catalyst oxide present to catalytic metal, and charging the catalyst thus obtained to a synthesis reactor for further conversion of carbon monoxide and hydrogen into hydrocarbons.

7. A process for regenerating an iron catalyst which has become spent as a result of continued contact with carbon monoxide and hydrogen in the synthesis of hydrocarbons by the reduction of carbon monoxide with hydrogen, which comprises contacting said spent iron catalyst with ethanol at a temperature of from about 625° to about 680° F. whereby said ethanol is converted into acetone, said process being effected in the absence of hydrocarbon synthesis, continuing the treatment of said spent iron catalyst with ethanol at least until a definite decrease in acetone formation is observed, thereafter subjecting the resulting treated catalyst to the action of hydrogen at a temperature of from about 1000° to about 1400° F. to convert substantially all of the iron oxide present to metallic iron, and charging the catalyst thus obtained to a synthesis reactor for further conversion of carbon monoxide and hydrogen into hydrocarbons.

8. In a process for converting ethanol to acetone the step which comprises contacting ethanol at a temperature of from about 540 to about 700° F. with an iron catalyst which has become spent as a result of continued contact with carbon monoxide and hydrogen in the synthesis of hydrocarbons by the reduction of carbon monoxide with hydrogen, which catalyst contains carbon in both the free and carbidic forms, to produce a catalyst having a decreased carbon content, said process being effected in the absence of hydrocarbon synthesis.

9. In a process for converting ethanol to acetone the steps which comprise contacting ethanol vapors at a temperature of from about 540 to 700° F. with a fluidized bed of an iron catalyst which has become spent as a result of continued contact with carbon monoxide and hydrogen in the synthesis of hydrocarbons by the reduction of carbon monoxide with hydrogen, which catalyst contains carbon in both the free and carbidic forms, to produce a catalyst having a decreased carbon content, said process being effected in the absence of hydrocarbon synthesis, and removing from the reaction zone a vaporous mixture containing acetone.

10. In a process for converting ethanol to acetone the steps which comprise contacting ethanol vapors at a temperature of from about 540 to 700° F. and at a pressure of from about 150 to about 600 p. s. i. with a fluidized bed of an iron catalyst which has become spent as a result of continued contact with carbon monoxide and hydrogen in the synthesis of hydrocarbons by the reduction of carbon monoxide with hydrogen, which catalyst contains carbon in both the free and carbidic forms, to produce a catalyst having a decreased carbon content, said process being effected in the absence of hydrocarbon synthesis, and removing from the reaction zone a vaporous mixture containing acetone.

11. In a process for regenerating a spent iron catalyst which has become spent as a result of continued contact with carbon monoxide and hydrogen in the synthesis of hydrocarbons by the reduction of carbon monoxide with hydrogen, the step which comprises contacting said spent catalyst with ethanol at a temperature of from about 540° to about 700° F. whereby said ethanol is converted into acetone, said process being effected in the absence of hydrocarbon synthesis.

12. In a process for regenerating a spent iron catalyst which has become spent as a result of continued contact with carbon monoxide and hydrogen in the synthesis of hydrocarbons by the reduction of carbon monoxide with hydrogen, the steps which comprise contacting said spent catalyst with ethanol in a concentration of from about 40 to about 50 lbs. for each 50 lbs. of catalyst at a temperature of from about 625° to about 680° F. whereby said ethanol is converted into acetone, said process being effected in the absence of hydrocarbon synthesis, and continuing the treatment of said spent catalyst with said ethanol at least until a definite decrease in acetone formation is observed.

MYRON B. KRATZER.

REFERENCES CITED

The following references are of record in the file of this patent:

UNITED STATES PATENTS

| Number | Name | Date |
|---|---|---|
| 1,663,350 | Roka | Mar. 20, 1928 |
| 2,448,279 | Rubin | Aug. 31, 1948 |
| 2,455,419 | Johnson | Dec. 7, 1948 |
| 2,486,633 | Clark | Nov. 1, 1949 |

OTHER REFERENCES

"The Oil and Gas Journal" (Jan. 19, 1946), pp. 86 and 89.